(12) United States Patent
Tsukiji

(10) Patent No.: US 6,702,311 B2
(45) Date of Patent: Mar. 9, 2004

(54) MOTORCYCLE FRONT VISOR ATTACHMENT STRUCTURE

(75) Inventor: Kensuke Tsukiji, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/231,202

(22) Filed: Aug. 30, 2002

(65) Prior Publication Data
US 2003/0047934 A1 Mar. 13, 2003

(30) Foreign Application Priority Data

Sep. 7, 2001 (JP) ........................................ 2001-271218

(51) Int. Cl.$^7$ .............................................. B62D 25/18
(52) U.S. Cl. ..................................... 280/152.2; 180/219
(58) Field of Search ................................. 180/218, 219; 280/276, 279, 288.4, 304.3, 847, 851, 852, 152.2, 152.3, 156, 160.1

(56) References Cited

U.S. PATENT DOCUMENTS 5,201,384 A * 4/1993 Kiyota et al. ................ 180/219
5,261,504 A * 11/1993 Katsura ....................... 180/219

FOREIGN PATENT DOCUMENTS

JP          59-83185         6/1984

* cited by examiner

Primary Examiner—Lesley D. Morris
Assistant Examiner—Matthew Luby
(74) Attorney, Agent, or Firm—Birch, Stewart, Kolasch & Birch, LLP

(57) ABSTRACT

A front visor attachment structure provided with a front fender attachment member formed in a front part of a bottom bridge supporting a front fork. A front fender and a lower part of a front visor are attached to the front fender attachment member, and an upper part of the front visor is attached to a top bridge. A projection member at the end of a bolt projects above the front fender attachment member, and the lower part of the front visor is engaged with the projection member. Since the front fender and the front visor are attached to the front fender attachment member of the bottom bridge, the shape of the bottom bridge can be simplified.

14 Claims, 8 Drawing Sheets

MOTORCYCLE FRONT VISOR ATTACHMENT STRUCTURE

CROSS-REFERENCE TO RELATED APPLICATIONS

The present application claims priority under 35 USC 119 to Japanese Patent Application No. 2001-271218 filed on Sep. 7, 2001, the entire contents thereof is hereby incorporated by reference.

BACKGROUND OF THE INVENTION

1. Field of the Invention

The present invention relates to a motorcycle front visor attachment structure.

2. Description of Background Art

A known motorcycle front visor attachment structure is e.g. Japanese Published Unexamined Utility-Model Application No. Sho 59-83185, entitled "Front Number Plate Attachment Structure in Vehicle Such As Motorcycle". According to FIG. 2 of the publication, in the front number plate attachment structure in vehicle such as a motorcycle, a pair of attachment holes 5a directed upward and downward are provided on the front end side of a bottom bridge 5 coupled to a pair of front forks 6. A pair of projections 10b of a front number plate 10 are engaged in these attachment holes 5a, and an upper part of the front number plate 10 is fixed to a top bridge 4 by a bolt 11. On the other hand, a front fender 8 is attached to a lower surface of the bottom bridge 5 by a screw.

The bottom bridge 5 of the above device has attachment holes 5a for the front number plate 10 as well as the attachment holes for the front fender 8n formed therein. Therefore, it has a complicated shape.

Further, when a force is applied to the projection 10b of the front number plate 10, since stress concentration occurs at the foot of the projection 10b, the projection 10b must be sufficiently robust. As a result, the cost of the front number plate 10 increases.

SUMMARY AND OBJECTS OF THE INVENTION

Accordingly, the object of the present invention is to provide a motorcycle front visor attachment structure which simplifies the shape of bottom bridge and simplifies the attachment structure.

To attain the above-described object, in a first aspect of the present invention a motorcycle front visor attachment structure is provided in which a front visor is disposed in front of a front fork, and a front fender attachment member is provided in a front part of a bottom bridge for supporting the front fork. The front fender is attached to the front fender attachment member by a bolt from a position thereunder. Further, a projection member at an end of the bolt is projected above the front fender attachment member, and a lower part of the front visor is engaged with the projection member.

Since the front fender and the front visor are both attached to the front fender attachment member, the attachment member serves as an attachment member on the bottom bridge side. As a result, it is not necessary to provide a specialized attachment seat for attaching the bottom side of the visor. The shape of the bottom bridge is simplified, and the attachment structure is simplified.

Further, as the projection member at the end of the bolt is projected above the front fender attachment member, it is not necessary to integrally form the bottom bridge with a pin. As a result, the shape of the bottom bridge is further simplified.

Further, the projection member at the end of the bolt is projected above the front fender attachment member, and the lower part of the front visor is engaged with the projection member. That is, as an engagement hole engaged with the projection member is provided in the lower part of the front visor, bending moment as in the case of projection or shaft does not occur. The stress concentration is reduced, and the strength of the front visor is improved.

In a second aspect of the present invention, a grommet is attached to the projection member of the bolt such that a screw of the projection member is protected.

Since the grommet protects the screw of the projection member, the screw thread of the projection member and the lower part of the front visor do not interfere with each other upon engagement of the lower part of the front visor.

Further, as the grommet protects the screw of the projection member, the screw thread of the projection member does not interfere with a screw thread of the front fender attachment member upon removal of the bolt from the bottom bridge.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
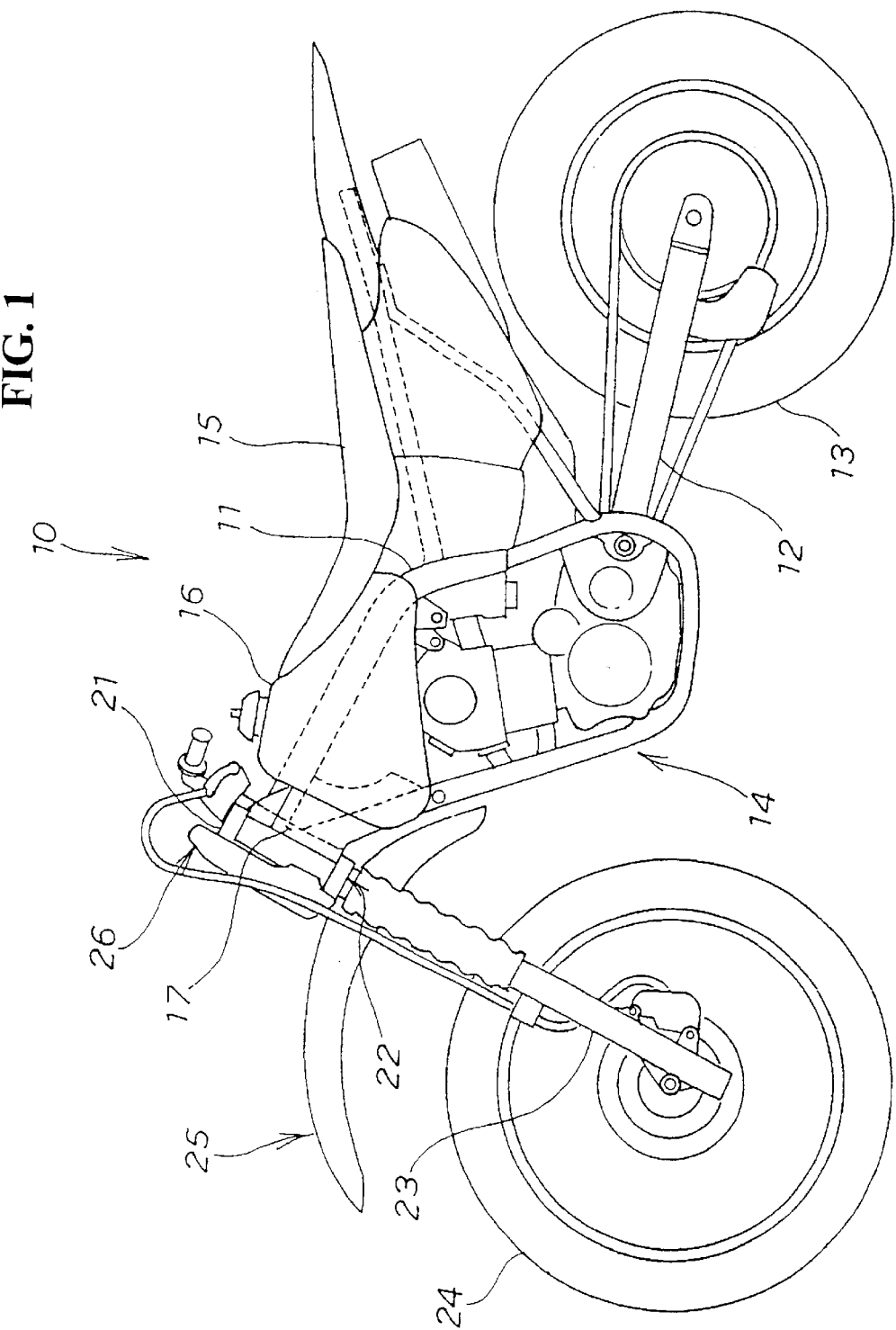
FIG. 1 is a side view of the motorcycle in which the front visor attachment structure according to the present invention is employed.

A working example of the present invention will be described below with reference to the attached drawings. Note that the drawings are to be seen along the orientation of reference numerals. "Front" means a frontward side, and "rear", the opposite side.

FIG. 1 is a side view of motorcycle employing the front visor attachment structure according to the present invention. A motorcycle 10 has a vehicle body frame 11, a swing arm 12 upward/downward movably extended from a lower part of the vehicle body frame 11, and a rear wheel 13 attached to a rear part of the swing arm 12. An engine 14 is attached to the center of the vehicle body frame 11, a seat 15 is provided in an upper part, a fuel tank 16, a top bridge 21 and a bottom bridge 22 are connected to a head pipe 17 at a front end of the vehicle body frame 11, a front fork 23 is supported by these top and bottom bridges 21 and 22, and a front wheel 24 is attached to the front fork 23. Also shown are a front fender 25 and a front visor 26 provided in front of the front fork 23.

Figure 2:
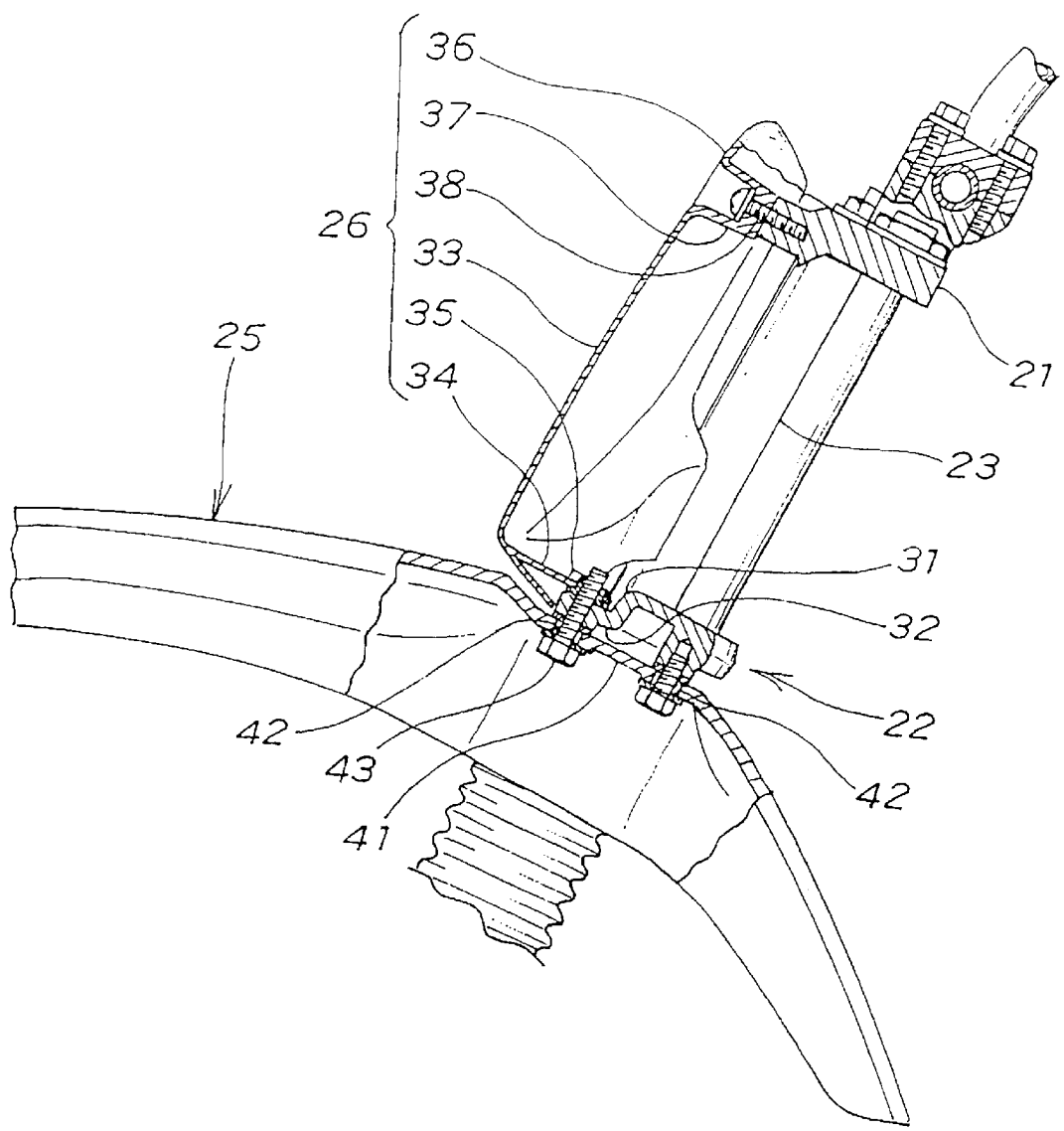
FIG. 2 is a cross-sectional view of the motorcycle front visor attachment structure according to the present invention.

FIG. 2 is a cross-sectional view of the motorcycle front visor attachment structure according to the present invention.

In the front visor attachment structure, a front fender attachment member 32 is provided in a front part 31 of the bottom bride 22 supporting the front fork 23. Both the front fender 25 and a lower part of the front visor 26 are attached to the front fender attachment member 32. An upper part of the front visor 26 is attached to the top bridge 21.

In the front visor 26, engagement holes 35, 35 (not shown) are formed in a lower part 34 of a main body 33, a boss 37 is provided in an upper part 36 of the main body 33, and a hole 38 is formed in the boss 37.

In the front fender 25, a seat 41 is provided, and 4 holes 42 . . . ( . . . denotes a plural form.) are formed in the seat 41.

Figure 3:
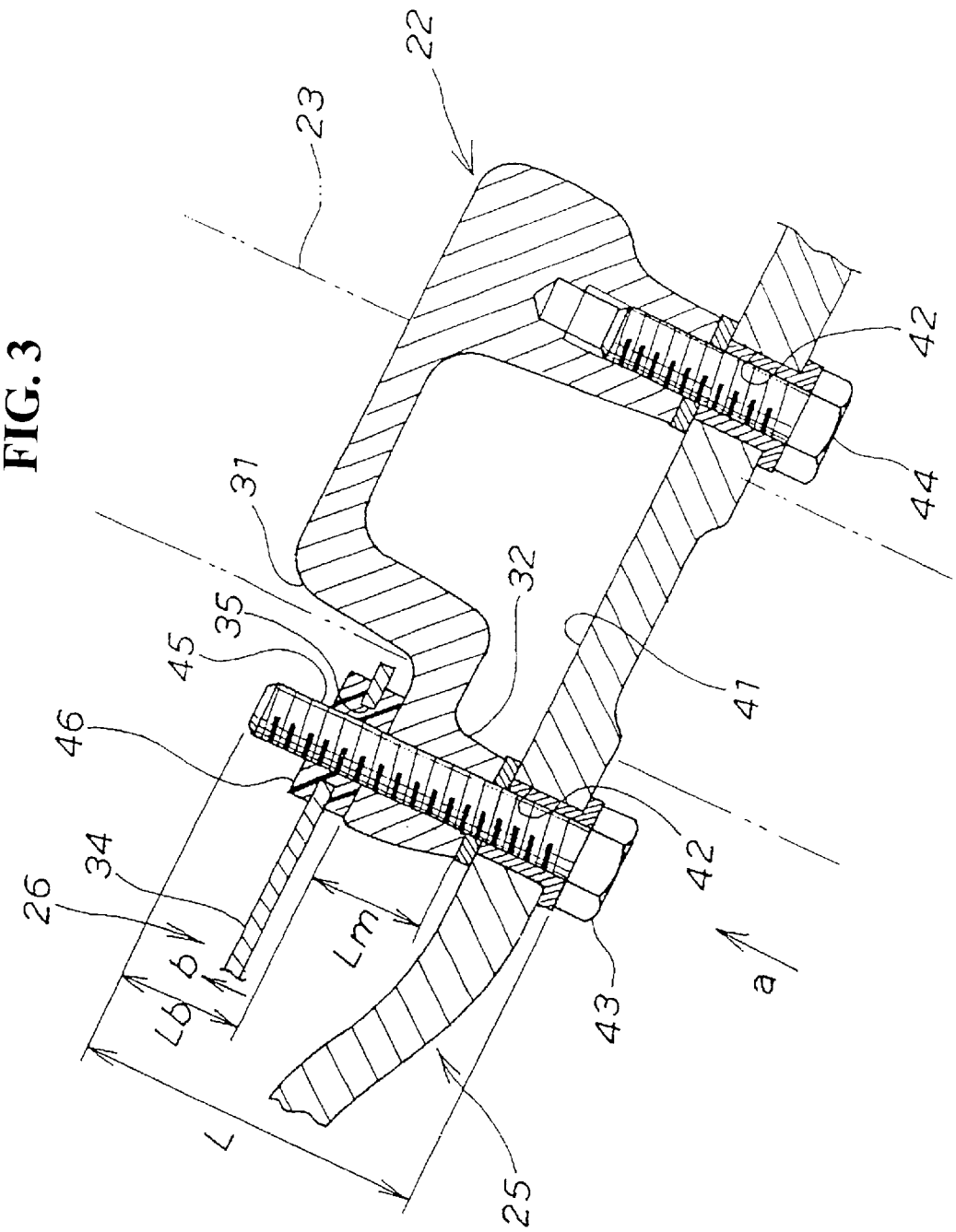
FIG. 3 is a detailed diagram of the front visor attachment structure according to the present invention.

FIG. 3 is a detailed diagram of the front visor attachment structure according to the present invention, showing that the front fender 25 is attached to the front fender attachment member 32 from a position thereunder (an arrow a direction) by a plurality of bolts 43 and 44. A projection member 45 at the end of the bolt 43 projects above (an arrow b direction) the front fender attachment member 32, and the lower part 34 of the front visor 26 is engaged with the projection member 45.

Here, a grommet 46 is fit in the engagement hole 35 formed in the lower part 34 of the front visor 26 in advance, and the front visor 26, with the grommet 46, is engaged with the projection member 45 projected from the end of the bolt 43.

The material of the grommet 46 is, e.g., resin (including rubber).

In the bolt 43, a nominal length is L, a screw length is approximately L, the length of projection member 45 is Lb, and an engagement length is Lm. Note that the engagement length Lm is the same as the length of a female screw formed in the front fender attachment member 32 of the bottom bridge 22.

Figure 4:
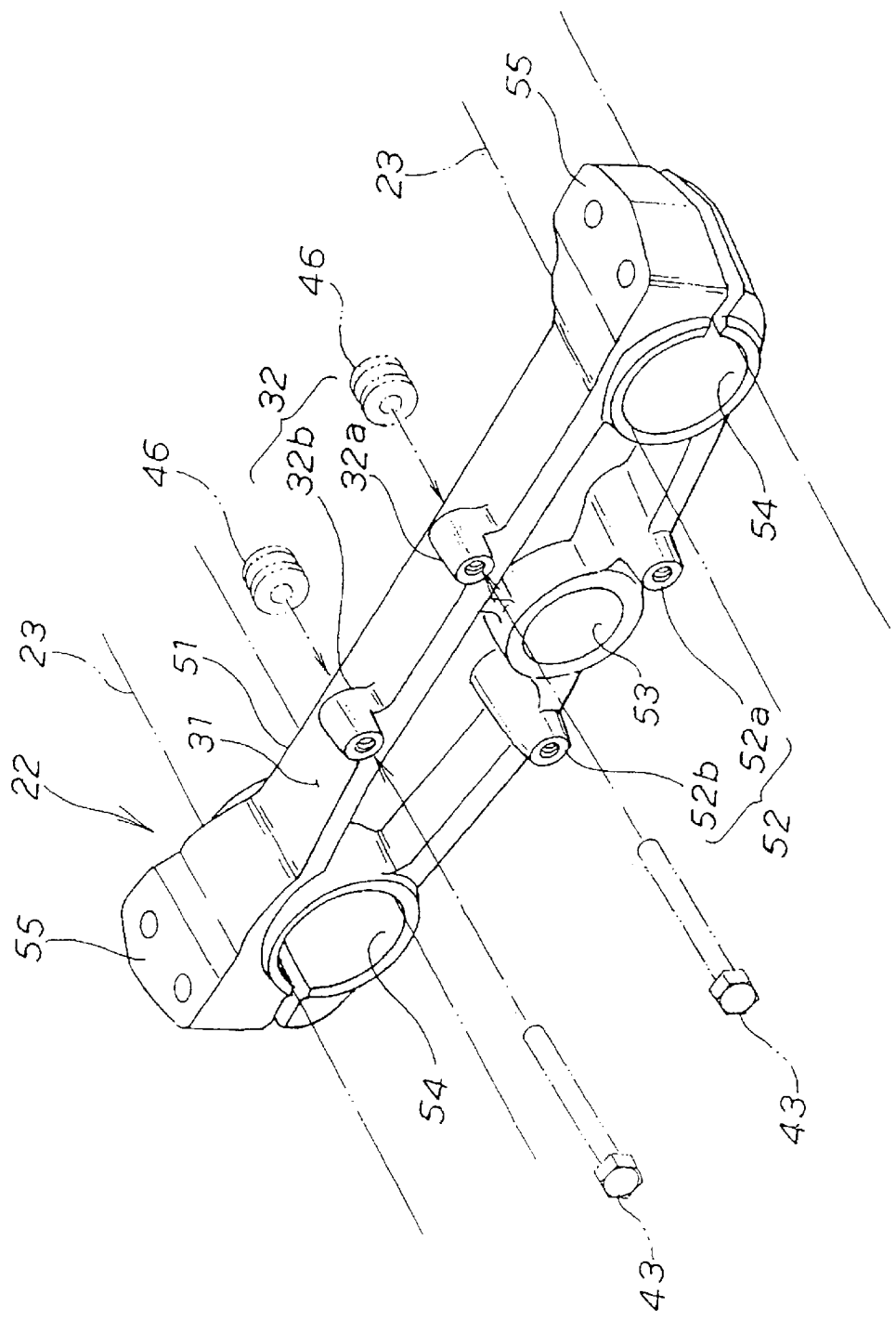
FIG. 4 is a perspective view of the bottom bridge according to the present invention.

FIG. 4 is a perspective view of the bottom bridge according to the present invention. In the bottom bridge 22, the front fender attachment member 32 (first attachment member 32a and second attachment member 32b) is formed in the front part 31 of a main body 51. Further, a rear front fender attachment member 52 (first attachment member 52a and second attachment member 52b) is formed on the rear side, and a stem shaft connection hole 53 is provided at the center. Front fork engagement holes 54, 54 are provided at both ends, and tightening members 55, 55 are formed in these front fork engagement holes 54, 54.

Figure 5:
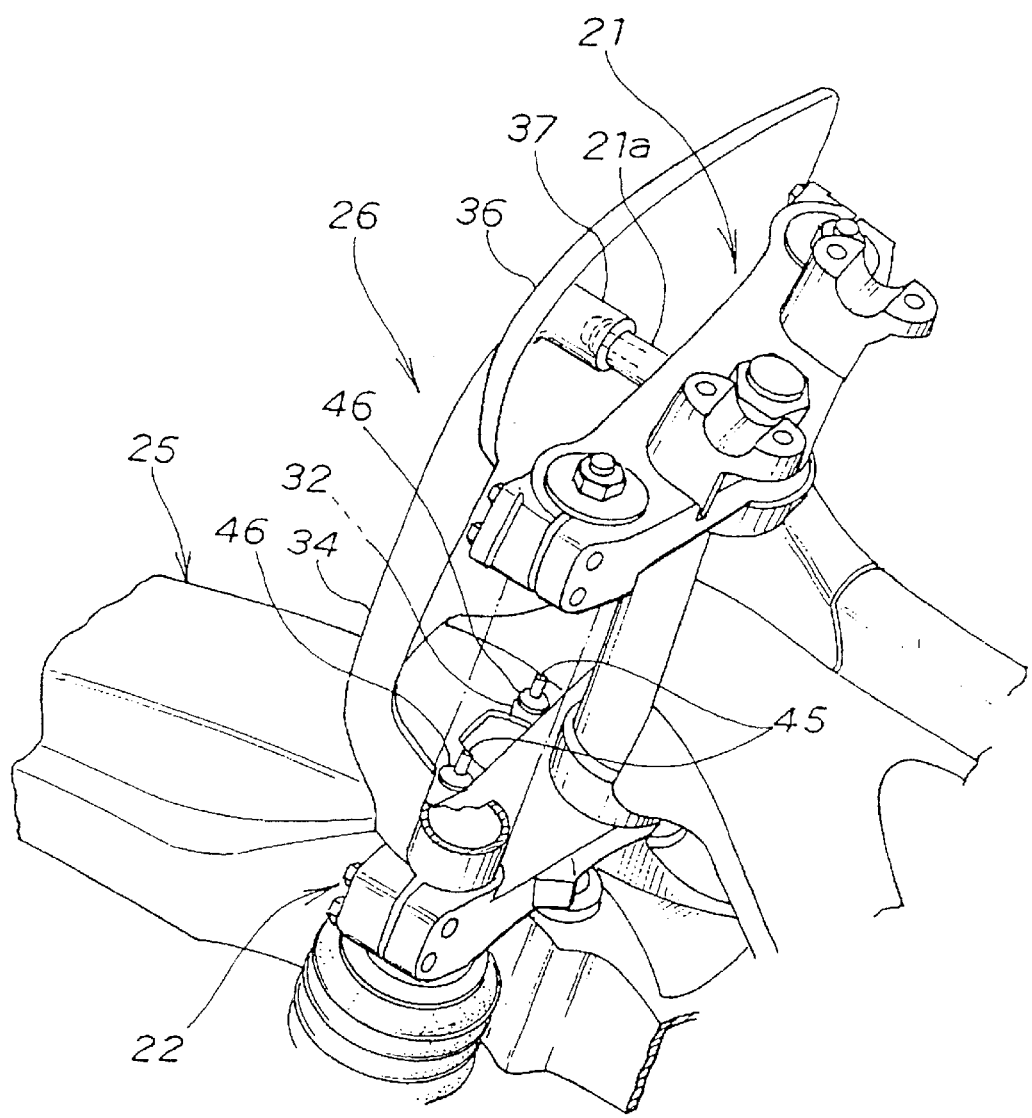
FIG. 5 is a perspective view of the front visor attachment structure according to the present invention.

FIG. 5 is a perspective view of the front visor attachment structure according to the present invention. FIG. 5 shows that the front fender 25 is attached to the front fender attachment member 32 of the bottom bridge 22, the lower part 34 of the front visor 26 is engaged with the projection members 45, 45 via the grommets 46, 46, and the boss 37 of the upper part 36 of the front visor 26 is attached to the top bridge 21. Also shown is a convex member 21a formed in the front part of the top bridge 21.

Figure 6:
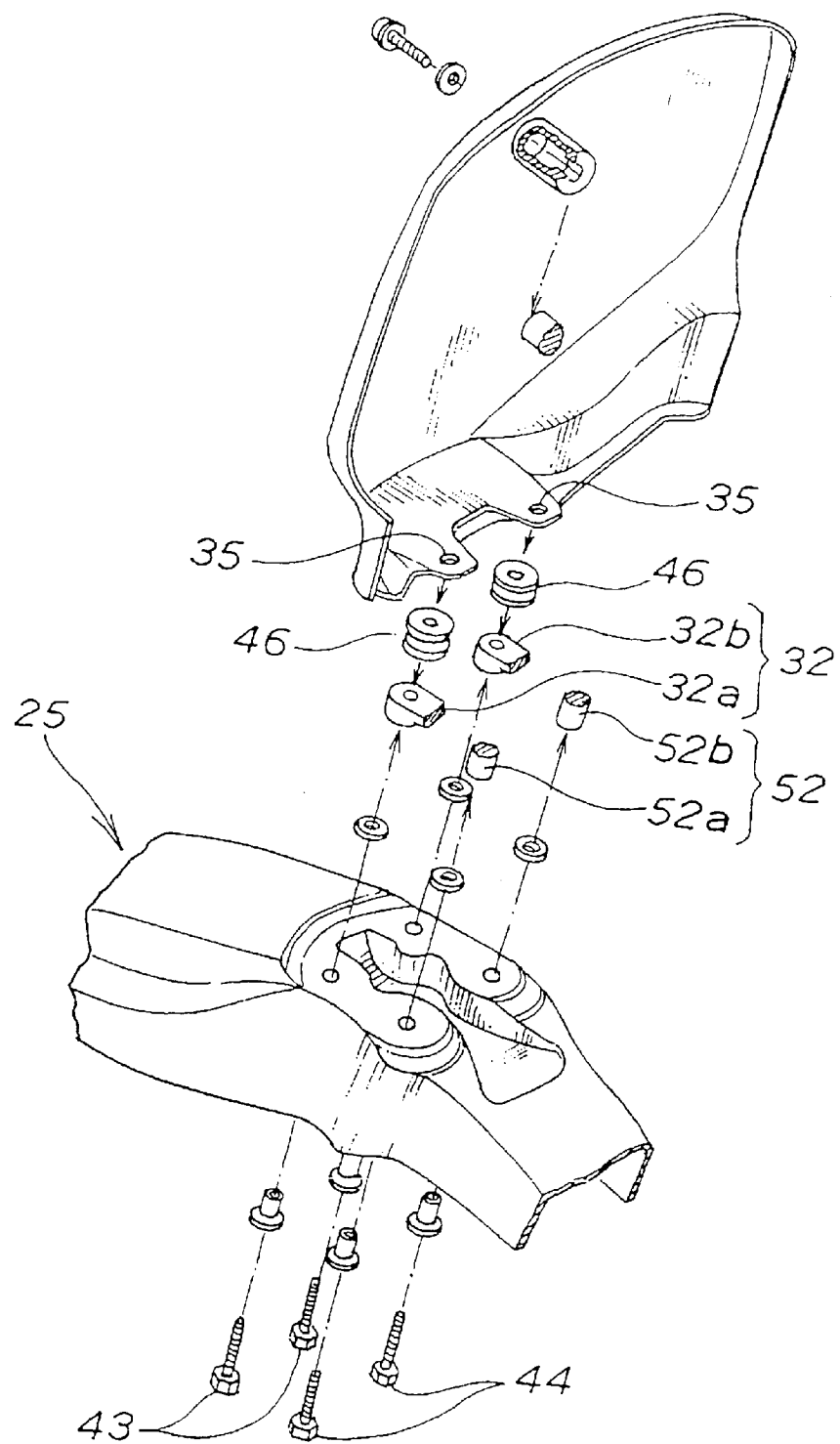
FIG. 6 is an exploded view of the front visor attachment structure according to the present invention.

FIG. 6 is an exploded view of the front visor attachment structure according to the present invention, showing that the front fender 25 is attached to the front fender attachment member 32 (first attachment member 32a and second attachment member 32b) and the rear front fender attachment member 52 (first attachment member 52a and second attachment member 52b) from a position thereunder via bolts 43, 43 and 44, 44. The grommets 46, 46, which are fit into the engagement holes 35, 35 in advance, are attached to the bolts 43, 43.

Next, the operations of the motorcycle front visor attachment structure will be described.

As shown in FIG. 3, the front fender attachment member 32 is provided in the front part 31 of the bottom bridge 22 supporting the front fork 23. Since both the front fender 25 and the front visor 26 are attached to the front fender attachment member 32, an attachment member used to attach the front fender 25 to the bottom bridge 22 also attaches the front visor 26 to the bottom bridge 22. As a result, it is not necessary to provide a specialized attachment seat for attachment of the front visor 26 in the bottom bridge 22. The shape of the bottom bridge 22 can be simplified, and the attachment structure can be simplified.

Further, since the front fender 25 is attached to the front fender attachment member 32 from a position thereunder by the bolts 43 and 44, the projection member 45 at the end of the bolt 43 is projected above the front fender attachment member 32, and the lower part 34 of the front visor 26 is engaged with the projection member 45, it no specialized pins are needed for engagement of the lower part 34 of the front visor 26 in the bottom bridge 22. The shape of the bottom bridge 22 can be further simplified.

Further, since the front fender 25 is attached to the front fender attachment member 32 from a position thereunder by the bolts 43 and 44, the projection member 45 at the end of the bolt 43 is projected above the front fender attachment member 32, and the lower part 34 of the front visor 26 is engaged with the projection member 45, it can be engaged with the engagement hole 35. Thus, the need to provide a projection or shaft in the front visor 26 is eliminated, and bending moment by such a shaft does not occur in the lower part 34 of the front visor 26. This reduces the concentration of stress which can occur in the lower part 34. Accordingly, incremental weight is suppressed, and the strength of the front visor 26 is improved.

As shown in FIG. 3, since the grommet 46 is attached to the projection member 45 of the bolt 43 such that the screw of the projection member 45 is protected, interference by the lower part 34 with the screw thread can be prevented upon engagement of the lower part 34 of the front visor 26.

Further, since the grommet 46 is attached to the projection member 45 of the bolt 43 such that the screw of the projection member 45 is protected, the screw thread of the projection member 45 does not interfere with the screw thread of the front fender attachment member 32 upon removal. The bolt 43 can be easily loosened.

In the bolt 43 in FIG. 3, since the screw length is approximately the same as the nominal length L, a JIS standard bolt can be used. The production cost of the bolt 43 can be reduced.

Next, two modifications of the motorcycle front visor attachment structure according to the present invention will be described.

Figure 7:
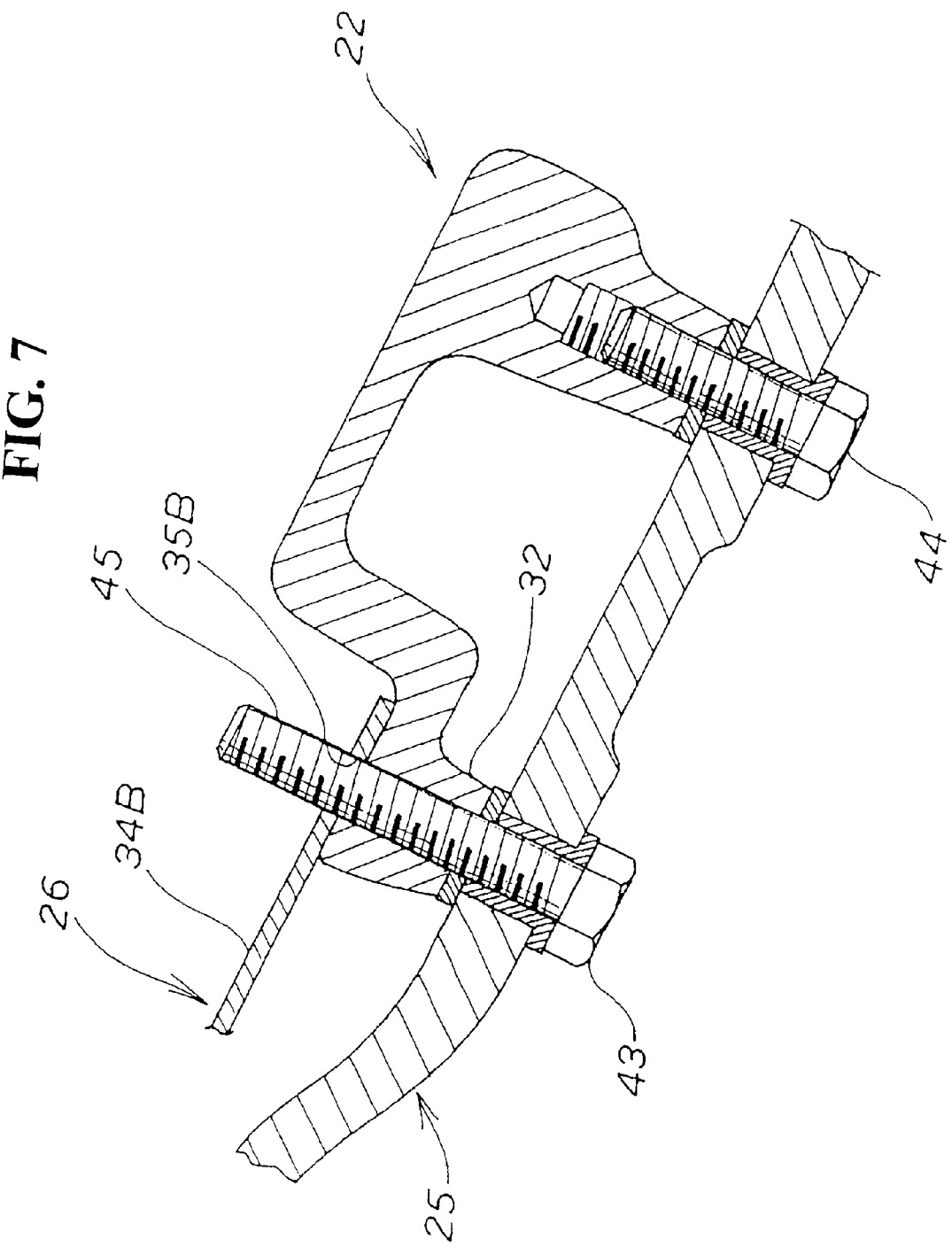
FIG. 7 is a diagram showing a first modification of the front visor attachment structure of the present invention.

FIG. 7 is a first modification diagram. Constituent elements are similar to those of the working example shown in FIG. 3 and have the same reference numerals. Thus, the explanations thereof will be omitted.

The front visor attachment structure here is characterized in that the structure has no grommet. That is, a lower part 34B of the front visor 26 is directly engaged with the projection member 45 of the bolt 43. Predetermined-sized engagement holes 35B, 35B (not shown) corresponding to the outer diameter of the bolt 43 are formed in the lower part 34B.

In this manner, as the front visor attachment structure of the first modification does not use a grommet, the cost of manufacturing the grommet and the work of attachment of the grommet can be omitted, and the production cost can be reduced.

Figure 8:
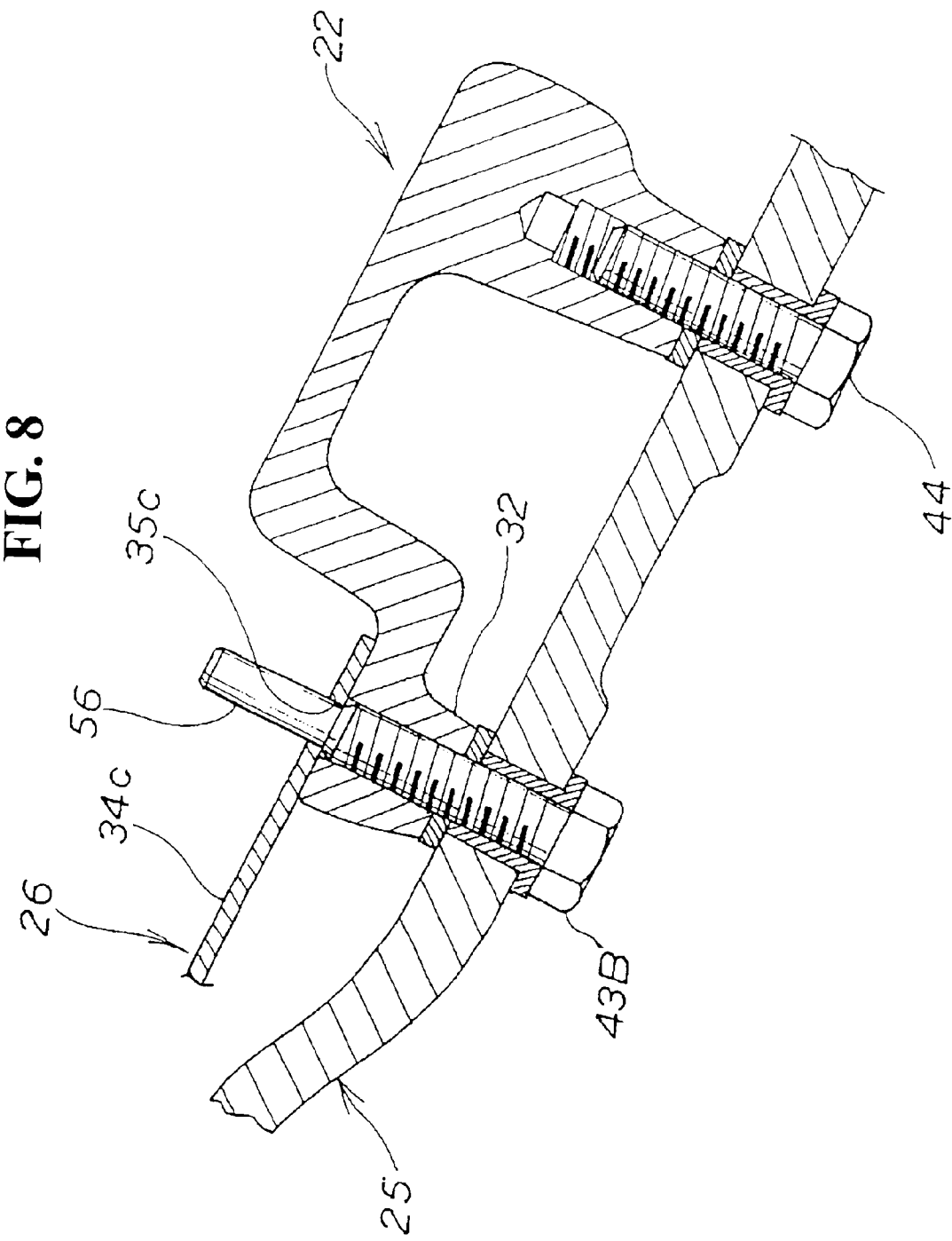
FIG. 8 is a diagram showing a second modification of the front visor attachment structure of the present invention.

FIG. 8 is a second modification diagram. Again, the constituent elements are similar to those of the working example shown in FIG. 3 and have the same reference numerals.

The front visor attachment structure here is characterized in that the structure employs a bolt 43B. The bolt 43B is obtained by forming a pin 56 without screw thread in a projection portion at the end of the bolt.

Predetermined-sized engagement holes 35C, 35C (not shown) corresponding to the outer diameter of the pin 56 are formed in a lower part 34C of the front visor 26.

In this manner, in the front visor attachment structure of the second modification, since the lower part 34C of the front visor 26 is directly inserted into the pin 56 at the end of the bolt 43B and engaged there, time for screwing the bolt 43B into the bottom bridge 22 can be reduced, and the production efficiency can be improved.

Further, as the lower part 34C of the front visor 26 is directly engaged with the pin 56, the work of attaching the grommet can be omitted.

Note that the type of the bolt 43 in FIG. 3 shown in the working example of the present invention is arbitrary, so long as the nominal length L of the bolt is ensured.

The front visor 26 is an example, and the shape of the lower part and the entire shape of the front visor are arbitrary.

The present invention provides the following effects.

In the first aspect of the present invention, the motorcycle front visor attachment structure in which the front visor is provided in front of the front fork, the front fender attachment member is provided in the front part of the bottom bridge supporting the front fork. The front fender is attached to the front fender attachment member by a bolt from a position thereunder. The projection member at the end of the bolt is projected above the front fender attachment member, and the lower part of said front visor is engaged with the projection member. Accordingly, the attachment member is used to attach both the front fender and the front visor to the bottom bridge. As a result, it is not necessary to provide a specialized attachment seat for attachment of the front visor in the bottom bridge. The shape of the bottom bridge can be simplified, and the attachment structure can be simplified.

Further, since the front fender is attached to the front fender attachment member from a position thereunder by the bolt, the projection member at the end of the bolt is projected above the front fender attachment member, and the lower part of the front visor is engaged with the projection member, there is no need to provide specialized pins for engagement of the lower part of the front visor in the bottom bridge. The shape of the bottom bridge can be further simplified.

Further, the front fender is attached to the front fender attachment member from a position thereunder by the bolt, the projection member at the end of the bolt is projected above the front fender attachment member, and the lower part of the front visor is engaged with the projection member. That is, as an engagement hole engaged with the projection member is formed in the lower part of the front visor, bending moment as in the case of projection or shaft does not occur. As a result, stress concentration which may occur in the lower part can be reduced, and the stress applied to the engaged portion can be reduced. Accordingly, incremental weight is suppressed, and the strength of the front visor can be improved.

In the second aspect of the present invention, the grommet is attached to the projection member of said bolt such that the screw of the projection member is protected. As a result, interference by the lower part with the screw thread can be prevented upon engagement of the lower part of the front visor.

Further, since the grommet is attached to the projection member of the bolt such that the screw of the projection member is protected, the screw thread of the projection member does not interfere with the screw thread of the front fender attachment member when the bolt is removed from the bottom bridge. The bolt can be easily loosened.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle front visor attachment structure in which a front visor is provided in front of a front fork, comprising:
    a front fender attachment member provided in a front part of a bottom bridge supporting said front fork;
    a bolt for attaching a front fender to the front fender attachment member, the bolt attaching the front fender from a position thereunder; and
    a projection member at an end of the bolt projected above the front fender attachment member,
    wherein a lower part of said front visor is engaged with the projection member.

2. The motorcycle front visor attachment structure according to claim 1, further comprising a grommet attached to the projection member of said bolt such that a screw of the projection member is protected.

3. The motorcycle front visor attachment structure according to claim 1, wherein the front visor is provided with engagement holes formed in a lower part of a main body of the front visor, a boss is provided in an upper part of the main body, and a hole is formed in the boss.

4. The motorcycle front visor attachment structure according to claim 1, wherein the projection member of the bolt has a predetermined length and an engagement portion of the bolt has a length that is equal to a length of a female screw formed in the front fender attachment member of the bottom bridge.

5. The motorcycle front visor attachment structure according to claim 1, wherein, the front fender attachment member is formed in the front part of a main body of the bottom bridge, a rear front fender attachment member is formed on a rear side of said main body, and a stem shaft connection hole is provided at a center of said main body.

6. The motorcycle front visor attachment structure according to claim 3, wherein the boss of the upper part of the front visor is attached to a top bridge.

7. The motorcycle front visor attachment structure according to claim 1, wherein the projection member of the bolt is a pin without screw threads.

8. A motorcycle front visor attachment structure in which a front visor is provided in front of a front fork, comprising:
- a front fender attachment member provided in a front part of a bottom bridge supporting the front fork;
- a front fender attached to the front fender attachment member by a plurality of bolts from a position thereunder; and
- projection members, said projection members being formed on at least some of said plurality of bolts, said projection members projecting above said front fender attachment member;
- wherein a lower part of said front visor is engaged with said projection members.

9. The motorcycle front visor attachment structure according to claim 8, wherein a grommet is attached to the projection members such that screws of the projection members are protected.

10. The motorcycle front visor attachment structure according to claim 8, wherein the front visor is provided with engagement holes formed in a lower part of a main body of the front visor, a boss is provided in an upper part of the main body, and a hole is formed in the boss.

11. The motorcycle front visor attachment structure according to claim 8, wherein the projection members formed on at least some of said plurality of bolts have a predetermined length, and engagement portions on said at least source of said plurality of bolts have lengths that are equal to lengths of female screws formed in the front fender attachment member of the bottom bridge.

12. The motorcycle front visor attachment structure according to claim 8, wherein, the front fender attachment member is formed in the front part of a main body of the bottom bridge, a rear front fender attachment member is formed on a rear side of said main body, and a stem shaft connection hole is provided at a center of said main body.

13. The motorcycle front visor attachment structure according to claim 10, wherein the boss of the upper part of the front visor is attached to a top bridge.

14. The motorcycle front visor attachment structure according to claim 8, wherein the projection members are formed as pins without screw threads.

* * * * *